United States Patent
Dustin et al.

(10) Patent No.: US 11,446,905 B2
(45) Date of Patent: Sep. 20, 2022

(54) CONDUCTIVE COMPOSITE AND METHOD FOR MANUFACTURING A CONDUCTIVE COMPOSITE

(71) Applicant: The Boeing Company, Chicago, IL (US)

(72) Inventors: Ashley Dustin, Los Angeles, CA (US); Xin Guan, Monterey Park, CA (US); Adam E. Sorensen, Glendale, CA (US); Andrew P. Nowak, Los Angeles, CA (US); Richard E. Sharp, Weldon Spring, MO (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 16/867,879

(22) Filed: May 6, 2020

(65) Prior Publication Data

US 2021/0347153 A1    Nov. 11, 2021

(51) Int. Cl.
| | | |
|---|---|---|
| *B32B 25/10* | (2006.01) | |
| *B32B 25/20* | (2006.01) | |
| *B32B 25/08* | (2006.01) | |
| *B32B 5/02* | (2006.01) | |
| *B64C 1/06* | (2006.01) | |
| *B64C 3/20* | (2006.01) | |

(52) U.S. Cl.
CPC .............. *B32B 25/10* (2013.01); *B32B 5/026* (2013.01); *B32B 25/20* (2013.01); *B64C 1/068* (2013.01); *B64C 3/20* (2013.01); *B32B 2262/103* (2013.01); *B32B 2307/202* (2013.01); *B32B 2605/18* (2013.01)

(58) Field of Classification Search
CPC ......... B32B 25/10; B32B 5/026; B32B 25/20; B32B 2262/103; B32B 25/08; B32B 2307/202; B32B 2605/18; B64C 1/068
See application file for complete search history.

(56) References Cited

U.S. PATENT DOCUMENTS

| | | | | |
|---|---|---|---|---|
| 3,900,654 | A * | 8/1975 | Stinger ................. | H05B 3/146 428/428 |
| 4,015,981 | A | 4/1977 | Rogova et al. | |
| 4,037,009 | A * | 7/1977 | Severinsen ............ | B32B 27/40 442/8 |
| 5,173,256 | A | 12/1992 | Booth et al. | |
| 9,199,438 | B2 * | 12/2015 | Bories-Azeau ......... | H01B 1/22 |
| 2007/0098815 | A1 | 5/2007 | Bernstein | |
| 2011/0281070 | A1 * | 11/2011 | Mittal ................... | H05K 1/097 428/221 |

(Continued)

FOREIGN PATENT DOCUMENTS

| | | |
|---|---|---|
| KR | 101866118 | 6/2018 |
| WO | WO 2007/100382 | 9/2007 |

OTHER PUBLICATIONS

European Patent Office, Extended European Search Report, App. No. 21172239.2 (dated Oct. 6, 2021).

(Continued)

*Primary Examiner* — Joanna Pleszczynska
(74) *Attorney, Agent, or Firm* — Walters & Wasylyna LLC (57) ABSTRACT

A conductive composite includes a first layer of elastomeric polymer, a layer of conductive fluorofluid on the first layer of elastomeric polymer, and a second layer of elastomeric polymer on the layer of conductive fluorofluid.

28 Claims, 6 Drawing Sheets

(56) References Cited

U.S. PATENT DOCUMENTS

2014/0248496 A1 9/2014 Kuwajima et al.
2017/0043560 A1 2/2017 Kuwajima et al.
2019/0198190 A1 6/2019 Dustin et al.

OTHER PUBLICATIONS

Urbaniak-Domagaka: "Electrical Properties of Polyesters," Electrical and Electronic Properties of Materials, IntechOpen: http://dx.doi.org/10.5772/intechopen.78612 (2018).
Bartlett et al.: "Stretchable, High K Dielectric Elastomers through Liquid-Metal Inclusions," Advanced Materials, vol. 28, pp. 3726-3731 (2016).
Bettezzati et al.: "The Viscosity of Liquid Metals and Alloys," ActaMetallurgica, vol. 37, No. 7, pp. 1791-1802 (1989).
Boley et al.: "Direct Writing of Gallium-Indium Alloy for Stretchable Electronics," Advanced Functional Materials, vol. 24, pp. 3501-3507 (2014).
Dickey et al.: "Emerging Applications of Liquid Metals Featuring Surface Oxides," Applied Materials and Interfaces, vol. 6, pp. 18369-18379 (2014).
Fassler et al.: "Liquid Phase Metal Inclusions for a Conductive Polymer Composite," Advanced Functional Materials, vol. 27, pp. 1928-1932 (2015).
Jagatheesan et al.: "Electromagnetic Shielding Behaviour of Conductive Filler Composites and Conductive Fabrics—A review," Indian Journal of Fibre & Textile Research, vol. 39, pp. 329-342 (2014).
Jeong et al.: "Mechanically Stretchable and Electrically Insulating Thermal Elastomer Composite by Liquid Alloy Droplet Embedment," Scientific Reports, vol. 5, No. 18257 (2015).
Kramer et al.: "Masked Deposition of Gallium-lndium Alloys for Liquid-Embedded Elastomer Conductors," Advanced Functional Materials, vol. 23, pp. 5292-5296 (2013).
Liang et al.: "Liquid Metal Sponges for Mechanically Durable, All-Soft, Electrical Conductors," Journal of Materials Chemistry C, vol. 5, pp. 1586-1590 (2017).
Pande et al.: "Improved Electromagnetic Interference Shielding Properties of MWCNT-PMMA Composites Using Layered Structures," Nanoscale Res Lett 4:327-334 (2009).
Jeyakumar et al.: "Rheology of Liquid Metal and Alloys," Journal of Non-Newtonian Fluid Mechanics, vol. 166, pp. 831-838 (2011).
Park et al.: "Improved Electromagnetic Interference Shielding Properties Through the Use of Segregate Carbon Nanotube Networks," Materials, vol. 12 (2019).
Los et al.: "Metal-Polymer Composites for Electromagnetic Interference Shielding Applications," Polimery 2016, vol. 61, No. 10.
Shui et al.: "Nickel Filament Polymer-Matrix Composites with Low Surface Impedance and High Electromagnetic Interference Shielding Effectiveness," Journal of Electronic Materials, vol. 26, No. 8 (1997).

\* cited by examiner

CONDUCTIVE COMPOSITE AND METHOD FOR MANUFACTURING A CONDUCTIVE COMPOSITE

FIELD

The present application relates to the field of conductive composites.

BACKGROUND

A conductive composite, broadly defined, is any composite having significant electrical and/or thermal conductivity. Such conductive composites have a broad range of uses in areas such as telecommunications, power generation and distribution, defense, aerospace, medicine, and other areas.

Conductive composites are commonly manufactured by and/or properties are achieved by incorporating a polymeric material with solid conductive particles. To achieve sufficient conductivity, i.e., to reach percolation, high particle loading, typically in excess of 45 volume %, is often needed. The polymers used with these particle loading levels are normally rigid materials. As a consequence, these particle loading levels result in conductive films and coatings that have properties such as elongation at break, tensile strength, and thermal stability that make them inappropriate or difficult to use.

Accordingly, those skilled in the art continue with research and development in the field of conductive composites.

SUMMARY

In one embodiment, a conductive composite includes a first layer of elastomeric polymer, a layer of conductive fluorofluid on the first layer of elastomeric polymer, and a second layer of elastomeric polymer on the layer of conductive fluorofluid.

In another embodiment, a method for manufacturing a conductive composite includes forming a first layer of elastomeric polymer, forming a layer of conductive fluorofluid on the first layer of elastomeric polymer, and forming a second layer of elastomeric polymer on the layer of conductive fluorofluid.

Other embodiments of the disclosed conductive composite and method for manufacturing a conductive composite will become apparent from the following detailed description, the accompanying drawings, and the appended claims.

DETAILED DESCRIPTION

Figure 1:
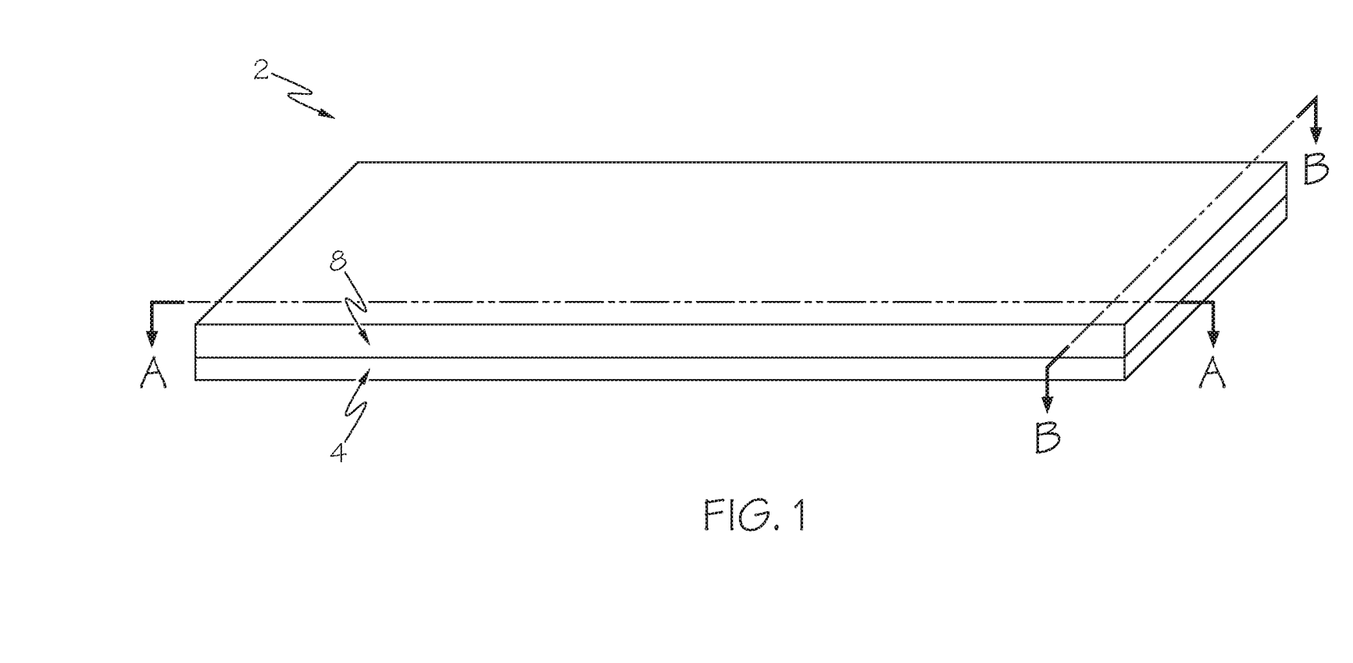
FIG. 1 is a perspective view of an exemplary conductive composite according to an exemplary embodiment of the present description.
Figure 2:
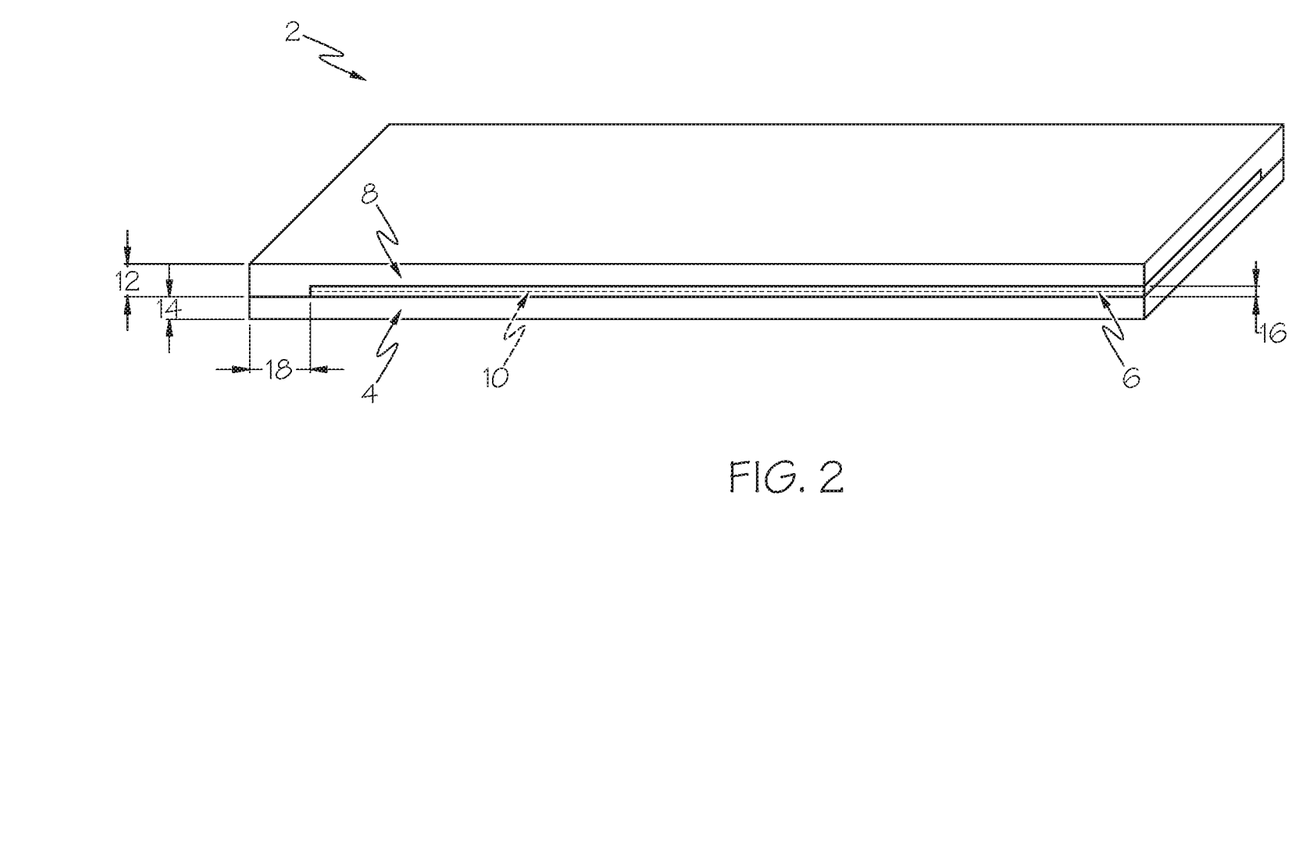
FIG. 2 is a sectional perspective view of the exemplary conductive composite of FIG. 1, sectioned along section lines A-A and B-B shown in FIG. 1.

FIG. 1 is a perspective view of an exemplary conductive composite according to an exemplary embodiment of the present description. FIG. 2 is a sectional perspective view of the exemplary conductive composite of FIG. 1, sectioned along section lines A-A and B-B shown in FIG. 1.

As shown in FIGS. 1 and 2, the conductive composite 2 includes a first layer of elastomeric polymer 4, a layer of conductive fluorofluid 6 on the first layer of elastomeric polymer 4, and a second layer of elastomeric polymer 8 on the layer of conductive fluorofluid 6, and an optional reinforcement mesh 10 in contact with the layer of conductive fluorofluid 6.

The present conductive composites, in embodiments, provide conductivity without rigidity; low viscosity conductive fluid without the use of common room temperature liquid metals and alloys such as gallium; and/or increased viscosity and flow properties to prevent leakage of the conductive-filled paste during composite use. Also, in embodiments, the present conductive composites allow for minimization of the amount of conductive paste required and the possibility for the paste leaching. Moreover, in embodiments, the conductive composites provide for additional conductivity and/or structural integrity without sacrificing elongation.

An elastomeric polymer is a polymer that shows elasticity at high strain levels. In an aspect, the elastomeric polymer of the present description is a polymer that exhibits an elongation at break of greater than about 50%. In another aspect, the elastomeric polymer of the present description is a polymer that exhibits an elongation at break of greater than about 100%. In yet another aspect, the elastomeric polymer of the present description is a polymer that exhibits an elongation at break of greater than about 200%. The elongation at break is measured as a percent the material is strained before it breaks upon application of tensile force. A percentage of the original length is used to express the elongation at break.

In an aspect, the elastomeric polymer of the present description is an electrical insulator. In an aspect, the elastomeric polymer of the present description is an electrical insulator having an electrical conductivity of less than about $1 \times 10^{-8}$ S/m. In another aspect, the elastomeric polymer of the present description is an electrical insulator having an electrical conductivity of less than about $1 \times 10^{-9}$ S/m. In yet another aspect, the elastomeric polymer of the present description is an electrical insulator having an electrical conductivity of less than about $1 \times 10^{-10}$ S/m.

The first layer of elastomeric polymer 4 and the second layer of elastomeric polymer 8 can include at least one of a thermoplastic polymer, a thermoset polymer, and combinations thereof. In an aspect, suitable elastomeric polymers for the first layer of elastomeric polymer 4 and the second layer of elastomeric polymer 8 have viscosities of from about 1,000 to about 100,000 cP under typical processing conditions. In another aspect, suitable elastomeric polymers for the first layer of elastomeric polymer 4 and the second layer of elastomeric polymer 8 have viscosities of from about 1,000 to about 25,000 cP under typical processing conditions. In yet another aspect, suitable elastomeric polymers for the first layer of elastomeric polymer 4 and the second layer of elastomeric polymer 8 have viscosities of from about 25,000 to about 50,000 cP under typical processing conditions. In yet another aspect, suitable elastomeric polymers for the first layer of elastomeric polymer 4 and the second layer of elastomeric polymer 8 have viscosities of from about 50,000 to about 75,000 cP under typical processing conditions. In yet another aspect, suitable elastomeric polymers for the first layer of elastomeric polymer 4 and the second layer of elastomeric polymer 8 have viscosities of from about 75,000 to about 100,000 cP under typical processing conditions. In certain examples, suitable thermoplastic elastomers for use herein have viscosities of from about 1,000 to about 50,000 cP under typical processing conditions. As used herein, the term "typical processing conditions" includes temperatures of from about room temperature (about 25° C.) to about 400° C., from about room temperature to about 200° C., or from about room temperature to about 100° C. Measuring techniques for measuring viscosity can include a viscometer, rheometer, or other suitable viscosity testing equipment. Such thermoplastic elastomers are convenient for making flexible materials.

Suitable elastomeric polymers for the first layer of elastomeric polymer 4 and the second layer of elastomeric polymer 8 include thermoplastic elastomeric polymers, thermoset elastomeric polymers, and combinations thereof. For example, suitable elastomeric polymers for the first layer of elastomeric polymer 4 and the second layer of elastomeric polymer 8 include siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, or combinations thereof. The first layer of elastomeric polymer 4 and the second layer of elastomeric polymer 8 may be formed from the same or different polymer composition.

In an aspect, at least one of the first layer of elastomeric polymer 4 and the second layer of elastomeric polymer 8 can include a conductive additive to create an electrical connection through the entire laminate. For example, the conductive additive can include particles (e.g. rods) added to at least one elastomeric polymer layer, wires added to at least one elastomeric polymer layer, or particles (e.g. rods) and wires added to at least one elastomeric polymer layer. By including conductive additive to an elastomeric polymer layer, an electrical connection to the layer of conductive fluorofluid 6 is enabled, which is desirable for some applications.

In the context of the present description, the conductive fluorofluid is a high viscosity fluid. The conductive fluorofluid of the present description is not cured or hardened into a solid state. Rather, the conductive fluorofluid of the present description retains the high viscosity fluid state. In an aspect, the conductive fluorofluid of the present description has a viscosity in a range of from about 2,000 to about 10,000,000 cP. In another aspect, the conductive fluorofluid of the present description has a viscosity in a range of from about 2,000 to about 5,000,000 cP. In yet another aspect, the conductive fluorofluid of the present description has a viscosity in a range of from about 2,000 to about 1,000,000 cP.

The conductive fluorofluid is a fluorofluid capable of carrying an electrical current. In an aspect, the conductive fluorofluid of the present description has an electrical conductivity of greater than about $1 \times 10^1$ S/m. In another aspect, the conductive fluorofluid of the present description has an electrical conductivity of greater than about $1 \times 10^2$ S/m. In yet another aspect, the conductive fluorofluid of the present description has an electrical conductivity of greater than about $1 \times 10^3$ S/m. In yet another aspect, the conductive fluorofluid of the present description has an electrical conductivity of greater than about $1 \times 10^4$ S/m. In yet another aspect, the conductive fluorofluid of the present description has an electrical conductivity of greater than about $1 \times 10^5$ S/m. The layer of conductive fluorofluid (6) may be homogeneous or heterogeneous.

In an aspect, the conductive fluorofluid includes a fluorinated component and a conductive additive. The fluorinated component can include, for example, at least one of a perfluoropolyether, a fluorinated acrylate oligomer, and combinations thereof.

In an aspect, the fluorinated component has a viscosity in a range of from about 2,000 to about 10,000,000 cP. In another aspect, the fluorinated component has a viscosity in a range of from about 2,000 to about 5,000,000 cP. In yet another aspect, the fluorinated component has a viscosity in a range of from about 2,000 to about 1,000,000 cP. However, the fluorinated component may have a lower viscosity and the viscosity of the conductive fluorofluid may be increased by way of the conductive additive or thickening agents.

In certain examples, the conductive additive has an average aspect ratio in a range of from 1 to about 2. A low aspect ratio conductive additive can take the form of, for example, a powder. The low aspect ratio conductive additive can have, for example, an average maximum dimension in range of from about 0.1 to about 500 µm, such as in range of from about 50 to about 150 µm. In other examples, the conductive additive has an average aspect ratio of greater than about 2, such as in a range of from about 2 to about 2,000. The high aspect ratio conductive additive can take the form of, for example, rods or wires. The high aspect ratio conductive additive can have, for example, an average maximum dimension in a range of from about 0.1 to about 10 mm.

The conductive additive used herein can also function as a viscosity modifier, helping to resist or minimize flow of the fluorofluid itself, and can aid in resisting or minimizing flow of fluorofluid within the layer of conductive fluorofluid. The conductive additive used herein may be, for example, inorganic materials. The conductive additive remains solid when mixed with the fluorinated component. The conductive additive are typically used as particles, e.g., in the shape of rods, wires, substantially spherical particles, or mixtures thereof, and the particle size dictates how readily the conductive additive homogenizes with the fluorofluid.

The conductive additive is electrically conductive. The conductive additive increases conductivity for the resulting conductive composite 2 or enables for the reduction of the amount of conductive fluorofluid 6 required for achieving the same conductivity. The overall conductivity is tunable through adjusting either the amount of fluorofluid or the amount of conductive additive.

In an aspect, the conductive additive includes, for example, at least one of carbon fiber, coated carbon fiber, and a metallic material, such as, for example, at least one of stainless steel, brass, and a metal or alloy of at least one of iron, nickel, titanium, aluminum, copper, silver, gold, platinum, palladium, and zinc, and combinations thereof. By way of a specific example, the conductive additive includes nickel coated carbon fiber.

In certain examples, the conductive additive comprises particles, e.g., rods or wires, of a conductive additive having an average aspect ratio greater than about 2, i.e., where the length is at least about twice the width. Average aspect ratio can be measured using a microscope.

In other examples, the conductive additive comprises particles, e.g., substantially spherical particles, of a conductive additive having an average aspect ratio less than about 2, i.e., where the length is at most about twice the width. In certain examples, the conductive additive comprises substantially spherical particles of a conductive additive having an average particle size of from about 0.1 to about 500 µm (from about 100 to about 500,000 nm). In certain examples, the conductive additive comprises substantially spherical particles having an average particle size of from about 1 to about 25 µm, or from about 25 to about 50 µm, or from about 50 to about 75 µm, or from about 75 to about 100 µm, or from about 100 to about 150 µm, or from about 150 to about 200 µm, or from about 200 to about 250 µm, or from about 250 to about 300 µm, or from about 300 to about 350 µm, or from about 350 to about 400 µm, or from about 450 to about 500 µm. In other examples, the conductive additive comprises substantially spherical particles of a conductive additive having an average particle size of from about 50 to about 150 µm. In certain examples, the particles of conductive additive having an average particle size of from about 0.1 to about 5 µm. The particle size can be measured using a Coulter Counter or Multisizer.

In an example, the conductive additive has an average aspect ratio greater than about 2 and comprising rods or wires having lengths of from about 0.01 to about 10 mm. In certain examples, the rods of conductive additive have lengths of from about 0.01 to about 0.5 mm, or from about 0.05 to about 10 mm, or from about 0.01 to about 10 mm, or from about 0.01 to about 10 mm, or from about 0.01 to about 0.1 mm, or from about 0.1 to about 1 mm, or from about 0.1 to about 1 mm, or from about 1 to about 5 mm, or from about 5 to about 10 mm. Use of conductive rods or wires contributes to the conductivity of the final composite to a larger extent than generally spherical conductive particles.

In certain examples, the conductive additive comprises a powder having particles with a mixture of rods or wires and substantially spherical particles or comprises a mixture of rods, wires, and substantially spherical particles.

The conductive additive may act as a thickener. In this case, the conductive additive can be used in an amount that produces an appropriate viscosity and/or to modulate the conductive properties of the resulting composite. The amount of conductive additive can be reduced when powders with particles in the shape of rods or wires are used as the conductive additive. Suitable amounts of rod or wire conductive additive agents in the conductive fluorofluid range from about 2 to about 40% by volume of the conductive fluorofluid. In certain examples, the amount of the conductive additive is from about 2% to about 5%, or from about 5 to about 10%, or from about 10 to about 15%, or from about 15 to about 20%, or from about 20 to about 25%, or from about 25 to about 30%, or from about 30 to about 40% by volume of the conductive fluorofluid.

Suitable electrical conductivity can be achieved in the conductive composites disclosed herein without necessitating high amounts of conductive additive in the conductive fluorofluid, i.e., loadings of such particles greater than about 45 volume percent. However, the conductive composites of the present description are not limited to particle loading levels of less than about 45 volume percent. Thus, particle loading levels above about 45 volume percent may be used in the conductive fluorofluid.

In an aspect, the layer of conductive fluorofluid can further include a non-conductive thickening agent. The thickening agent can include, for example, at least one of an organic thickening agent, an inorganic thickening agent, and combinations thereof.

In certain examples, the thickening agent has an average aspect ratio in a range of from 1 to about 2. A low aspect ratio thickening agent can take the form of, for example, a powder. The low aspect ratio thickening agent can have, for example, an average maximum dimension in range of from about 0.1 to about 500 µm, such as in range of from about 50 to about 150 µm. In other examples, the thickening agent has an average aspect ratio of greater than about 2, such as in a range of from about 2 to about 2,000. The high aspect ratio thickening agent can take the form of, for example, rods or wires. The high aspect ratio thickening agent can have, for example, an average maximum dimension in a range of from about 0.1 to about 10 mm.

The thickening agents used herein function as viscosity modifiers and can aid in resisting or minimizing flow of fluorofluid within the layer of conductive fluorofluid. The thickening agents used herein may be inorganic or organic materials. The thickening agents remain solid when mixed with the conductive fluorofluid. The thickening agents are typically used as particles, e.g., in the shape of rods, wires, substantially spherical particles, or mixtures thereof, and the particle size dictates how readily the powder homogenizes with the fluorofluid. Typically, thickening agents that have higher surface areas will be better thickeners than agents with lower surface areas.

In examples in which the conductive fluorofluid also includes a thickening agent, the thickening agent can be used in an amount that produces an appropriate viscosity.

In certain examples, the thickening agent used to make the conductive composite is an organic thickening agent. Examples of such compounds are maltol, phenol, naphthalene, 1-naphthol, 2-naphthol, 4-pyridone, and carbon, including, for example, graphite and carbon black. Where the organic thickening agent is a compound having a phenolic hydroxy group, the compound can react with the isocyanate groups of a di- or polyisocyanate via the hydroxy, but the reaction would be slower than the urethane or urea forming reactions. Used appropriately, such compounds can be used to modify the characteristics of the resulting thickening agent. The thickening agent may be a mixture of at least one organic thickening agent and at least one inorganic thickening agent.

In an aspect, the layer of conductive fluorofluid includes a compatibilizing agent. The compatibilizing agent can include, for example, at least one of an organic compatibilizing agent, an inorganic compatibilizing agent, and combinations thereof. When the compatibilizing agent includes an organic compatibilizing agent, the organic compatibilizing agent can include, for example, a surfactant, such as an ionic surfactant, a nonionic surfactant, and combinations thereof. When the compatibilizing agent includes an inorganic compatibilizing agent, the inorganic compatibilizing agent can include, for example, metallic nanoparticles.

The compatibilizing agents used herein improve the workability (e.g., flowability, ease of application) of the conductive fluorofluid.

In certain examples, the compatibilizing agents used herein can also be used to thicken the conductive fluorofluid, i.e., to increase the viscosity of the conductive fluorofluid.

In certain examples, the conductive fluorofluid used to form the conductive composites contain the fluorofluid and the compatibilizing agent at a weight ratio of the fluorofluid to compatibilizing agent of from about 5:1 to about 50:1, or from about 10:1 to about 30:1, or from about 15:1 to about 25:1, or from about 20:1 to about 25:1. Thus, the amount of compatibilizing agent as a percentage of the fluorofluid ranges from about 2 weight % to about 20 weight %. Particularly useful amounts of compatibilizing agent range from about 4 weight % to about 10 weight %. Weight percentage refers to the weight amount of the compatibilizing agent over the total weight of conductive fluorofluid. Phase separation is to be avoided. At higher levels of compatibilizing agent, phase separation may occur and this can be addressed using a thickening agent of the kind disclosed elsewhere herein.

In certain examples, the compatibilizing agent comprises inorganic, e.g., metallic, nanoparticles having an average particle size of less than about 100 nm, or less than about 90 nm, or less than about 80 nm, or less than about 70 nm, or less than about 60 nm, or less than about 50 nm, or less than about 40 nm, or less than about 30 nm, or less than about 20 nm, in any linear dimension. The particle sizes mentioned herein can be measured using a Coulter Counter or Multisizer, for example. Suitable nanoparticles comprise metals that are insoluble, i.e., do not dissolve, in the conductive fluorofluid. Examples of suitable metals for use as nanoparticle compatibilizing agents herein include metal or alloys of silver, copper, brass, bronze, nickel, stainless steel, carbon, coated carbon, titanium, tungsten, and combinations thereof.

In certain examples, the compatibilizing agent is a nonionic amphiphilic compound or mixture of nonionic amphiphilic compounds. Suitable nonionic amphiphilic compounds include fatty alcohol alkoxylates including fatty alcohol ethoxylates, alkylphenol alkoxylates including alkylphenol ethoxylates, fatty acid alkoxoxylates including fatty acid ethoxylates, alkoxylated amines including ethoxylated amines, fatty acid amides, polyoxyethylene-polyoxypropylene copolymers, fatty acid esters of polyhydroxy compounds, glycerol fatty acid esters, sorbitan fatty acid esters, sucrose fatty acid esters, alkyl polyglucosides, fatty amine oxides, sulfoxides, organophosphine oxides, and mixtures thereof.

In certain examples, the compatibilizing agent is an ionic compound. Suitable ionic amphiphilic compounds include anionic compounds and cationic compounds. Representative anionic compounds are alkyl sulfates, alkyl ether sulfates, alkyl sulfonates, alkyl ether sulfonates, alkyl phosphates, and alkyl carboxylates. Representative cationic compounds are quaternary ammonium compounds, monoalkylammonium salts, dialkylammonium salts, and trialkylammonium salts.

The choice of the particular anionic compound (or mixture thereof) or cationic compound (or mixture thereof) and the amount thereof used to form the layer of conductive fluorofluid will be determined by the particular elastomeric polymer used to manufacture the conductive composite. The type and amount of the anionic or cationic compound will be selected to avoid degrading or depolymerizing the elastomeric polymer.

In certain examples, the compatibilizing agent is a surfactant.

In certain examples, the compatibilizing agent is a nonionic amphiphilic compound or a mixture of such compounds. Particularly useful nonionic amphiphilic compounds are the alkylphenol ethoxylates. Representative alkylphenol ethoxyates are octylphenol ethoxylates such as Triton™ X-100 (polyethylene glycol p-(1,1,3,3-tetramethylbutyl)-phenyl ether having an average of 9.5 ethylene oxide units) and nonylphenol ethoxylates.

Other particularly useful nonionic amphiphilic compounds are the poloxamer, which are tri-block copolymers of poly(ethylene oxide) poly(propylene oxide)-poly(ethylene oxide) (PEO-PPO-PEO). For example, PLURONIC nonionic amphiphilic compound is suitable.

The conductive composites of the present description can also include additional materials to impart other characteristics to the conductive composites. In an aspect, the conductive composites includes an additive to increase thermo-oxidative stability. When the conductive composite include an additive to increase thermo-oxidative stability, the additive to increase thermo-oxidative stability can include, for example, at least one of a phosphate, an iron oxide, a phenolic, an antioxidant, a metal passivator, and combinations thereof. The thermo-oxidative stabilizer is a material or an additive that increases thermal oxidative stability. The thermo-oxidative stabilizer can be included into the conductive fluorofluid composition or added to the elastomeric polymer layers prior to forming the conductive composite. Depending on the characteristics desired in the conductive composite and the environment in which the conductive composite will be deployed, the thermo-oxidative stabilizer can be a phosphate, iron oxide, phenolic antioxidant, metal passivator, or combination thereof. Addition of a thermo-oxidative stabilizer to the conductive composites disclosed herein expands the operating temperature range of the conductive composite. Suitable metal passivators include nitrates such as nitric acid, citrates such as citric acid, tungstates, molybdates, chromates, and mixtures thereof.

Preparation of the conductive fluorofluid can be accomplished by, for example, mixing the fluorinated component, the conductive additive, and any optional components with centrifugal planetary mixer or shear mixing capabilities. The resulting conductive fluorofluid can be stored for future use.

In certain examples, the conductive fluorofluid disclosed herein and useful for preparing the conductive composites can have a loss modulus (G") greater than the storage modulus (G'), i.e., the conductive fluorofluid has a tan delta value greater than 1. Conductive fluorofluid compositions of this disclosure therefore behave more like liquids than solids. The conductive fluorofluid compositions of this disclosure can have viscosities of from about 500 Cp to about 1,000,000 Cp at 1 Hz when measured using a dynamic shear rheometer according to ASTM D7175.

The thickness of each layer of the conductive composite 2 can be adjusted as necessary to achieve the characteristics desired of the final product. In an aspect, as shown in FIG. 2, the first layer of elastomeric polymer 4 has a first thickness 14, and the second layer of elastomeric polymer 8 has a second thickness 12. The first thickness 14 and second thickness 12 may each be within a range of from about 0.01 mm to about 100 mm. In another aspect, the first thickness 14 and second thickness 12 may each be within a range of from about 0.1 mm to about 10 mm. For example, the first thickness 14 and the second thickness 12 can each be about 1 mm. The first thickness 14 may be the same or different than the second thickness 12. The layer of conductive fluorofluid has third thickness 16, which can be less than or equal to at least one of the first thickness 14 and the second thickness 12. Alternatively, the third thickness 16 can be greater than the at least one of the first thickness 14 and the second thickness 12. In an aspect, the third thickness 16 is less than a total of the first thickness 14 and the second thickness 12. In another aspect, the third thickness 16 is less than at least one of the first thickness 14 and the second thickness 12. For example, the first thickness 14 and the second thickness 12 can be about 1 mm, and the third thickness 16 can be less than about 1 mm. An overall thickness of the conductive composite 2 can be with a range of about 0.03 mm to about 200 mm. In an aspect, an overall thickness of the conductive composite 2 can be with a range of about 0.1 mm to about 100 mm. In another aspect, an overall thickness of the conductive composite 2 can be with a range of about 0.5 mm to about 10 mm.

The conductive composite 2 can include one or more additional layers of elastomeric polymer and one or more additional layers of conductive fluorofluid. For example, the conductive composite can contain a total of five layers, three layers of elastomeric polymer alternating with two layers of conductive fluorofluid.

In an aspect, the conductive composite 2 is the form of a laminate, in which a continuous layer of conductive fluorofluid 6 is sandwiched between the first layer of elastomeric polymer 4 and the second layer of elastomeric polymer 8. The continuous layer of conductive fluorofluid 6 may be flat or curved. In one expression, the continuous layer of conductive fluorofluid 6 has a length that is much greater than a thickness of the continuous layer of conductive fluorofluid 6. In an aspect, the length of the continuous layer of conductive fluorofluid 6 is at least five times the thickness of the continuous layer of conductive fluorofluid 6. In another aspect, the length of the continuous layer of conductive fluorofluid 6 is at least twenty times the thickness of the continuous layer of conductive fluorofluid 6. In yet another aspect, the length of the continuous layer of conductive fluorofluid 6 is at least fifty times the thickness of the continuous layer of conductive fluorofluid 6. In another expression, the continuous layer of conductive fluorofluid 6 has a length and a width that are much greater than a thickness of the continuous layer of conductive fluorofluid 6. In an aspect, the length and the width of the continuous layer of conductive fluorofluid 6 are at least five times the thickness of the continuous layer of conductive fluorofluid 6. In another aspect, the length and the width of the continuous layer of conductive fluorofluid 6 are at least twenty times the thickness of the continuous layer of conductive fluorofluid 6. In yet another aspect, the length and the width of the continuous layer of conductive fluorofluid 6 are at least fifty times the thickness of the continuous layer of conductive fluorofluid 6.

The edges of the conductive composite 2 around the layer of conductive fluorofluid 6 can be sealed in any manner. In an aspect, edge of the conductive composite 2 can be sealed by contact of the second layer of elastomeric polymer 8 with the first layer of elastomeric polymer 4. For example, the first layer of elastomeric polymer 4 and the second layer of elastomeric polymer 8 may be separated by the layer of conductive fluorofluid 6 except at the edges of the conductive composite 2 around the layer of conductive fluorofluid 6 where the first layer of elastomeric polymer 4 and the second layer of elastomeric polymer 8 are in contact with one another. The second layer of elastomeric polymer 8 may be capable of curing to the first layer of elastomeric polymer 4 to form an effective encapsulant. The edge length 18 of the edges of the conductive composite 2 around the layer of conductive fluorofluid prevents overstressing the bonding between the first layer of elastomeric polymer 4 and the second layer of elastomeric polymer 8. In an aspect, the edge length 18 is greater than at least one of the first thickness 14 and the second thickness 12.

The layer of conductive fluorofluid 6 of the present description provides electrical conductivity to the conductive composite 2 without necessitating rigidity, and the high viscosity of the layer of conductive fluorofluid inhibits leakage of the conductive fluorofluid during coating or use. The present description further includes, as shown in FIGS. 2 and 3B, a reinforcement mesh 10 in contact with the layer of conductive fluorofluid 6. The reinforcement mesh 10 in contact with the layer of conductive fluorofluid 6 alters the flow property of the conductive fluorofluid 6 to further reduce the possibility for leaching and better retain the conductive fluorofluid 6 within the conductive composite 2. The reinforcement mesh 10 can also improve elongation and recovery, minimizing hysteresis, of the overall conductive composite.

The reinforcement mesh 10 may move freely with respect to the first layer of elastomeric polymer 4 and the second layer of elastomeric polymer 8 to avoid reduction of elasticity of the conductive composite 2, or the reinforcement mesh 10 may be attached to one of the first layer of elastomeric polymer 4 or the second layer of elastomeric polymer 8 to provide additional structural integrity.

The reinforcement mesh 10 may be electrically conductive or electrically non-conductive. A conductive reinforcement mesh 10 increases conductivity for the resulting conductive composite 2, or the reinforcement mesh 10 enables for the reduction of the amount of conductive fluorofluid 6 for achieving the same conductivity. Reducing the amount of conductive fluorofluid 6 in the conductive composite 2 can further reduce the possibility for leaching and better retain the conductive fluorofluid 6 within the conductive composite 2. In an aspect, the conductivity of an electrically conductive mesh is greater than about $1 \times 10^3$ S/m. In another aspect, the conductivity of an electrically conductive mesh is greater than about $1 \times 10^4$ S/m. In yet another aspect, the conductivity of an electrically conductive mesh is greater than about $1 \times 10^5$ S/m.

In an aspect, the reinforcement mesh 10 is a continuous reinforcement mesh layer in contact with the continuous layer of conductive fluorofluid 6. In one expression, the continuous reinforcement mesh layer has a length that is much greater than a thickness of the continuous reinforcement mesh layer. In an aspect, the length of the continuous reinforcement mesh layer is at least five times the thickness of the continuous reinforcement mesh layer. In another aspect, the length of the continuous reinforcement mesh layer is at least twenty times the thickness of the continuous reinforcement mesh layer. In yet another aspect, the length of the continuous reinforcement mesh layer is at least fifty times the thickness of the continuous reinforcement mesh layer. In another expression, the continuous reinforcement mesh layer has a length and a width that are much greater than a thickness of the continuous reinforcement mesh layer. In an aspect, the length and the width of the continuous reinforcement mesh layer are at least five times the thickness of the continuous reinforcement mesh layer. In another aspect, the length and the width of the continuous reinforcement mesh layer are at least twenty times the thickness of the continuous reinforcement mesh layer. In yet another aspect, the length and the width of the continuous reinforcement mesh layer are at least fifty times the thickness of the continuous reinforcement mesh layer. The reinforcement mesh 10 may have a length and width that is greater than, equal to, or less than the continuous layer of conductive fluorofluid 6.

Additionally, if the conductive composite 2 is the form of a laminate, the laminate construction allows for co-location of the continuous layer of conductive fluorofluid 6 and the continuous layer of reinforcement mesh 10, in which the continuous layer of conductive fluorofluid 6 and the continuous layer of reinforcement mesh 10 are sandwiched between the first layer of elastomeric polymer 4 and the second layer of elastomeric polymer 8.

The reinforcement mesh 10 may be or include a fabric, such a knit fabric, a woven fabric, or combinations thereof. The fabric may be a non-conductive fabric, a conductive fabric, or combinations thereof. A conductive fabric increases conductivity for the resulting conductive composite 2.

The non-conductive fabric may be or include, for example, polyether polyurea copolymer, latex, poly-para-phenylene terephthalamide, aramid, nylon, polyester, or combinations thereof. However, any fabric that is chemically suitable for use with the conductive fluorofluid 6 may be used. A non-conductive fabric may be coated with a conductive material to result in a conductive fabric.

The conductive fabric may include or be formed from conductive filaments, coated non-conductive fabric, or combinations thereof. Exemplary conductive filaments include silver filaments, copper filaments, brass filaments, nickel filaments, stainless steel filaments, steel filaments, aluminum filaments, carbon filaments, coated carbon filaments, titanium filaments, tungsten filaments, tin filaments, zinc filaments, and combinations thereof. Exemplary coated non-conductive fabrics include metallic coated polyether-polyurea copolymer, metallic coated latex, metallic coated poly-paraphenylene terephthalamide, metallic coated aramid, metallic coated nylon, metallic coated polyester, carbon coated polyether-polyurea copolymer, carbon coated latex, carbon coated poly-paraphenylene terephthalamide, carbon coated aramid, carbon coated nylon, carbon coated polyester, and combinations thereof.

In certain examples, the conductive composites 2 of the present description exhibits a minimum sheet resistance of less than about 100 Ohm/sq. The sheet resistance of a particular conductive composite will depend on the ultimate use. For example, a minimum sheet resistance of less than about 100 Ohm/sq is preferred when the conductive composite is to be used to shield electrical components from electromagnetic radiation, e.g., to minimize electromagnetic interference that may disrupt or harm sensitive electronics. Sheet resistivity can be determined using, for example, a four point probe, during the manufacturing process or before final encapsulation.

In certain examples, the conductive composites 2 of the present description exhibit an elongation at break greater than or equal to about 10%. In other examples, the conductive composites 2 of the present description exhibit an elongation at break greater than or equal to about 25%. In yet other examples, the conductive composites 2 of the present description exhibit an elongation at break greater than or equal to about 50%. The elongation at break is measured as a percent the material is strained before it breaks upon application of tensile force. A percentage of the original length is used to express the elongation at break.

In certain examples, the conductive composites 2 of the present description exhibit a tensile strength greater than or equal to about 3 MPa.

In certain examples, the conductive composites 2 of the present description has a density of less than about 7 g/mL, less than about 6 g/mL, less than about 5 g/mL, or less than about 4 g/mL. In certain examples, the conductive composite has a density of between about 2 and about 10 g/mL. In other examples, the conductive composite has a density between about 10 and about 20 g/mL. In still other examples, the conductive composite has a density between about 1 and about 5 g/mL, or between about 3 and about 8 g/mL. This parameter can readily be measured by determining the mass of a known volume or measuring the volume of water displaced by a known mass.

In certain examples, the conductive composites 2 of the present description exhibit a maximum bulk conductivity of about $5 \times 10^5$ S/m at 20° C.

In certain examples, the conductive composite is flexible. In certain examples, the conductive composite has a tensile strength greater than or equal to about 3 MPa. In certain examples, the conductive composite is flexible and has a tensile strength greater than or equal to about 3 MPa.

This disclosure also provides products, items, and structures comprising a substrate carrying a layer of a conductive composite disclosed herein. Such products, items, and structures can be made by heating a thermoplastic or thermoset conductive composite as disclosed herein and applying it to a substrate. In certain examples, the conductive composite can be a portion of an aircraft, such as all or a portion of at least one of a wing and a fuselage of an aircraft. In certain examples, the conductive composite can be at least one of a seal and a gasket.

Figure 3A:
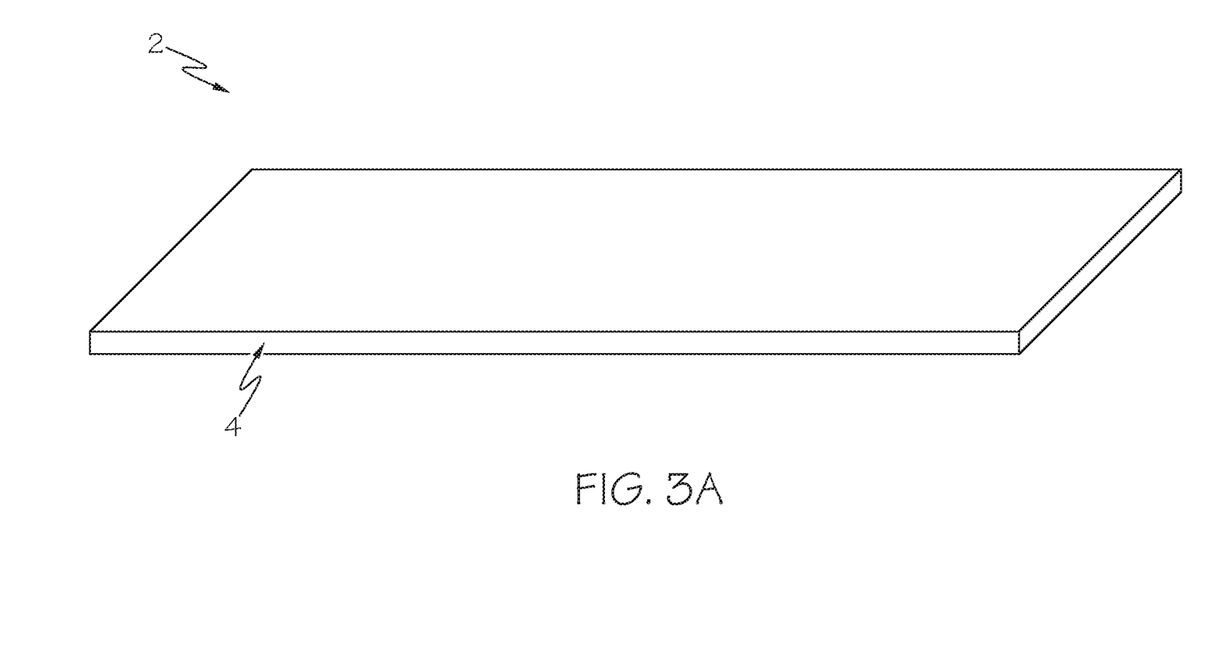
FIGS. 3A to 3C are perspective views illustrating steps for manufacturing the exemplary conductive composite of FIGS. 1 and 2.
Figure 3B:
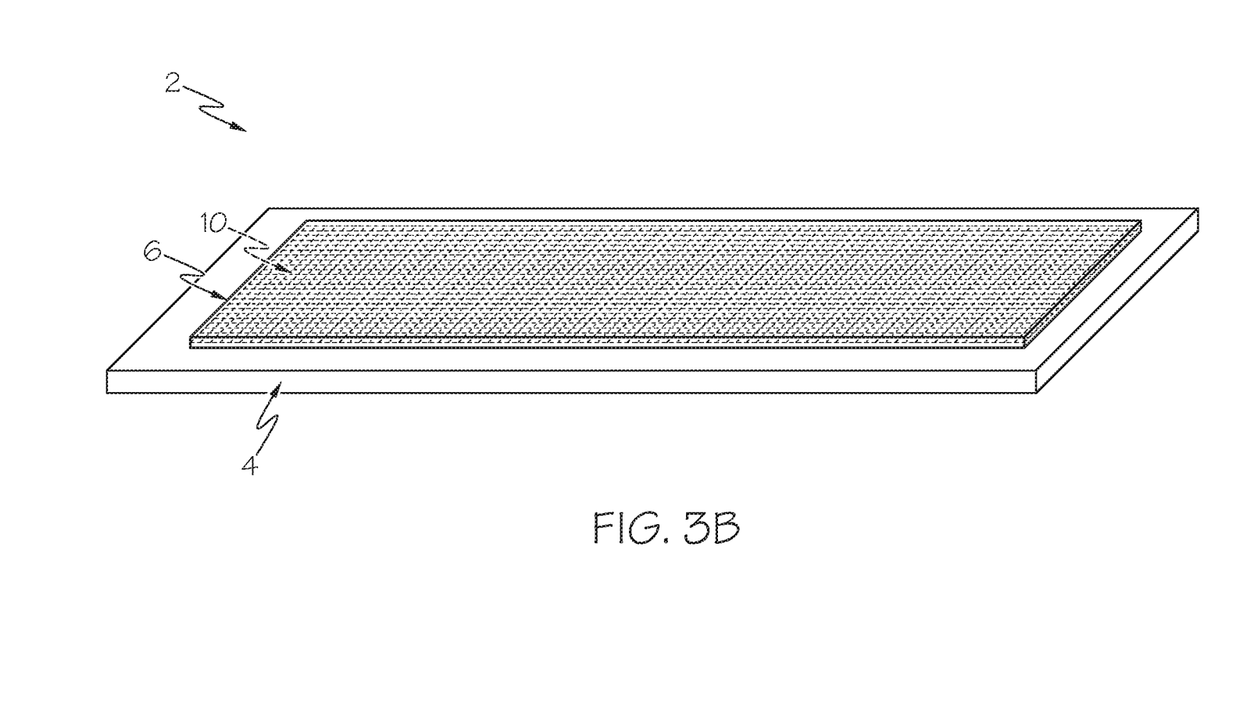
Figure 3C:
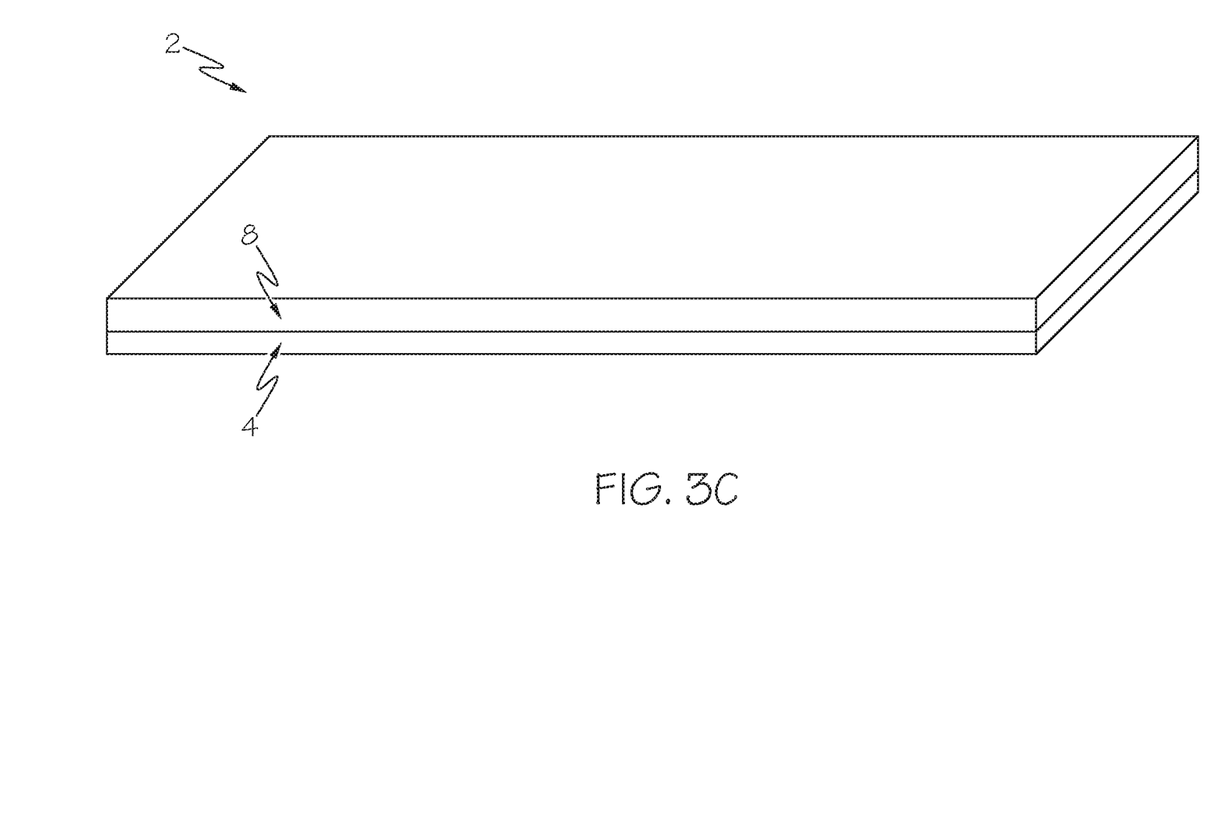

As shown in FIGS. 3A, 3B, and 3C, the conductive composites 2 of the present disclosure can be made by forming a first layer of elastomeric polymer 4 (see FIG. 3A) and forming a layer of conductive fluorofluid 6 on the first layer of elastomeric polymer 4 (see FIG. 3B). The layer of conductive fluorofluid 6 can be reinforced with a reinforcement mesh 10 either before or after forming the layer of conductive fluorofluid 6. Then, a second layer of elastomeric polymer 8 is formed on the layer of conductive fluorofluid 6 (see FIG. 3C).

In an aspect, the step of forming the first layer of elastomeric polymer includes curing the first layer of elastomeric polymer. The step of curing the first layer of elastomeric polymer can include curing the first layer of elastomeric polymer.

In certain examples, the step of forming the layer of conductive fluorofluid includes mixing the fluorinated component and the conductive additive. In other examples, the step of forming the layer of conductive fluorofluid includes mixing the fluorinated component, the conductive additive, and a compatibilizing agent. In other examples, the step of forming the layer of conductive fluorofluid includes mixing the fluorinated component, the conductive additive, and an additive to increase thermo-oxidative stability, and optionally a compatibilizing agent. In an aspect, the step of forming the layer of conductive fluorofluid includes compounding the conductive fluorofluid using shear mixing. The shear mixing can be performed at a rotation speed of in a range of from about 25 to about 2,000 rpm, such as in a range of from about 25 to about 125 rpm. In another aspect, the step of forming the layer of conductive fluorofluid includes infiltrating the reinforcement mesh 10 with the conductive fluorofluid.

In certain examples, the step of forming the second layer of elastomeric polymer includes curing the second layer of elastomeric polymer. The step of curing the second layer of elastomeric polymer can include bonding the second layer of elastomeric polymer to the first layer of elastomeric polymer.

After forming the second layer of elastomeric polymer, the method of the present description may include trimming the conductive composite around the layer of conductive fluorofluid. In an aspect, the trimming leaves an edge length around the layer of conductive fluorofluid.

By way of example, the conductive composites of this disclosure can be made by layering a conductive fluorofluid onto the surface of a first cured or partially cured elastomeric polymer and by layering a second elastomeric polymer thereon.

In another example, the conductive composites of this disclosure can be made by spreading a conductive fluorofluid onto a non-stick surface, applying uncured elastomeric polymer over the conductive fluorofluid, and then curing the elastomeric polymer. The conductive composite can then be conveniently removed from the non-stick surface by peeling the conductive composite from the non-stick surface. After removal from the non-stick surface, and if necessary or desirable, an additional layer of cured or uncured elastomeric polymer may be added over the conductive fluorofluid and cured if necessary to produce a sandwich or laminate structure.

Laminate composites of this disclosure can be made by layering a conductive fluorofluid onto the surface of a first elastomeric polymer and applying a layer of a second elastomeric polymer over the layer of conductive fluorofluid. The second elastomeric polymer may be the same or different than the first elastomeric polymer. Adding a layer of the second elastomeric polymer will encapsulate the layer of conductive fluorofluid.

Laminate conductive composites of this disclosure can also be made by spreading a conductive fluorofluid onto a non-stick surface, applying uncured elastomeric polymer over the conductive fluorofluid, and then curing the elastomeric polymer. The conductive composite can then be conveniently removed from the non-stick surface by peeling the conductive composite from the non-stick surface. Where necessary, a second elastomeric polymer (which may be the same or different than the first elastomeric polymer) can optionally be applied over the layer of conductive fluorofluid. Adding a layer of the second elastomeric polymer will encapsulate the layer of conductive fluorofluid.

The non-stick surface can be any suitable non-stick material. Examples of suitable non-stick materials include polytetrafluoroethylene, anodized aluminum, ceramics, and enameled cast iron.

This disclosure also provides products, items, and structures comprising a substrate carrying a layer of a conductive composite disclosed herein, and in certain examples a flexible conductive composite as disclosed herein. Such products, items, and structures can be made by heating a thermoplastic or thermoset conductive composite as disclosed herein and applying it to a substrate. Alternatively, the flexible conductive composite could be adhesively bonded to a substrate.

A conductive fluorofluid composition may be prepared by combining the fluorinated component with the conductive additive and mixing the resulting mixture sufficiently to form a uniform conductive fluorofluid. The mixing can be accomplished with a shear mixer at about 25 to about 2500 rpm. In certain examples, the shear mixing to form the conductive fluorofluid composition is carried out at about 25 to about 125 rpm, or at about 125 to about 250 rpm, or at about 250 to about 400 rpm, or at about 400 to about 700 rpm, or at about 700 to about 1500 rpm, or at about 1500 to about 2500 rpm. Alternatively, the mixing can be carried out using a centrifugal planetary mixer. The resulting conductive fluorofluid can be stored for future use.

Additionally, the surfaces of the elastomeric polymer layers facing the layer of conductive fluorofluid may be treated to improve wetting of the liquid metal. This can include ultraviolet treatment, plasma treatment, or corona discharge treatment. Additionally, a surfactant may be applied to the elastomeric polymer layers facing the layer of conductive fluorofluid to improve wetting.

The following experimental examples illustrate additional features and properties of the conductive composite of the present description.

Materials

Luperox® A98 benzoyl peroxide was purchased from Sigma Aldrich and used as received. Stainless steel wires (3 mm×2 µm) and nickel wires (10 µm×0.25 mm, 10 µm×1 mm, and 10 µm×3 mm) were purchased from Intramicron and used as received. Stainless steel powder (type 316) was purchased from Atlantic Equipment Engineers and washed with acetone prior to use. Sylgard 184 silicone elastomer kit was purchased from Dow Corning and used as received. NuSil R21-2615 silicone was obtained from Nusil and used as received. Silver knits were created. Polyethylene glycol dimethacrylate (SR210) was obtained from Sartomer and used as received. FIRSTCURE® DMPT cure promoter was purchased from Albemarle and used as received. Fluorolink® PFPE E10-H, Fluorolink® AD1700 and Fomblin® HC/04 were obtained from Solvay and used as received. Nickel powder was purchased from Vale and used as received. FlexSeal Clear Liquid was purchased from a local homegoods store and used as received.

Control Example 1: Nusil R21-2615 Control 10 g NuSil R21-2615 Part A and 10 g NuSil R21-2615 Part B were mixed using a flacktek mixer for 1 min at 2300 rpm. The resulting homogeneous mixture of elastomeric polymer was poured on top of a Mylar release film and cast with a glass rod. Then the thin film of elastomeric polymer was heat cured at 60° C. for ~2 hours per manufacturer instructions.

Example 2: FlexSeal Control 10 g aliquot FlexSeal solution was cast on top of a Mylar release film and cast with a glass rod. The resulting elastomeric polymer thin film was cured at room temperature overnight (about 18 hours) per manufacturer instructions.

Example 3: Nickel Fluorogel and Laminate Composite Prepared Therefrom

Preparation of conductive fluorofluid: 131.25 g E10-H and 18.75 g SR210 were mixed at 2300 rpm for 1 minute. 90 g nickel powders from Vale were divided in 3 portions and added to the acrylate fluoro-solvent mixture using a flactek mixer for 1 minute at 2300 rpm. 60 g nickel wires (10 µm×0.25 mm) were mixed to the mixture via Flactek mixing for several minutes at 2300 rpm. The resulting nickel fluoro-solvent mixture was homogenized and with no visible chunks. In a separate container, 2 wt. % benzoyl peroxide (with respect to SR210) was added to 2 mL MEK solvent, and vortexed for couple minutes until it is fully dissolved. The benzoyl peroxide MEK solution was added to Ni-acrylate fluoro-solvent mixture, and mixed via Flactek mixer for 1 minute at 2300 rpm. 375 µL FIRSTCURE® DMPT cure promoter was added to the mixture, and mixed via Flactek mixer for 1 minute at 2300 rpm. The resulting homogenized mixture was heated at 110 C in a heating mantle. The polymerization occurred within 5 minutes. The nickel fluorogel was cured and formed a big chunk, and then broken into smaller pieces with a spatula, followed by a centrifugal mixing for 20 seconds at 2300 rpm. The resulting nickel fluorogel was spreadable/flowable.

Preparation of laminate composite: ~30 mil thick nickel fluorogel was cast on a cured FlexSeal Clear Liquid film. Additional FlexSeal Clear Liquid was cast on top of the nickel fluorogel to fully encapsulate the laminate composite, and cured at room temperature overnight. The thickness of this composite was about 100 mil.

Example 4: Nickel Fluorogel, with Silver Knit, and Laminate Composite Prepared Therefrom Preparation of conductive fluorofluid: 131.25 g E10-H and 18.75 g SR210 were mixed at 2300 rpm for 1 minute. 38.6 g nickel powders from Vale were added to the acrylate fluoro-solvent mixture using a flactek mixer for 1 minute at 2300 rpm. 25.7 g nickel wires (10 µm×0.25 mm) were mixed to the mixture via Flactek mixing for several minutes at 2300 rpm. The resulting nickel fluoro-solvent mixture was homogenized and with no visible chunks. In a separate container, 2 wt. % benzoyl peroxide (with respect to SR210) was added to 2 mL MEK solvent, and vortexed for couple minutes until it is fully dissolved. The benzoyl peroxide MEK solution was added to Ni-acrylate fluoro-solvent mixture, and mixed via Flactek mixer for 1 minute at 2300 rpm. 375 µL FIRSTCURE® DMPT cure promoter was added to the mixture, and mixed via Flactek mixer for 1 minute at 2300 rpm. The resulting homogenized mixture was heated at 110 C in a heating mantle. The polymerization occurred within 5 minutes. The nickel fluorogel was cured and formed a big chunk, and then broken into smaller pieces, followed by a centrifugal mixing for 20 seconds at 2300 rpm. The resulting nickel fluorogel was spreadable/flowable, and was able to be painted on fabric easily.

Preparation of infiltrated reinforcement mesh: a spatula was used to spread nickel fluoro gel evenly on a silver knit to form a nickel fluoro gel filled conductive silver knit:

Preparation of laminate composite: The nickel fluorogel filled silver knit was placed on a cured FlexSeal Clear Liquid film. Additional FlexSeal Clear Liquid was cast on top of the nickel fluorogel filled Silver knit to fully encapsulate the laminate composite, and cured at room temperature overnight. The thickness of this composite was about 100 mil.

Example 5: Nickel Fluorogel with Longer Nickel Wires and Laminate Composite Prepared Therefrom Preparation of conductive fluorofluid: 131.25 g E10-H and 18.75 g SR210 were mixed at 2300 rpm for 1 minute. 25.7 g Ni wires (10 µm×1 mm) were mixed to the mixture via overhead shear mixer at speed 2 overnight, followed by a speed 8 fast mixing for 1 hour. Next, 4 g nickel wires (8 µm×3 mm) were mixed to the mixture via overhead shear mixer at speed 2 overnight, followed by a centrifugal mixing for 1 minute at 2300 rpm. The resulting nickel fluoro-solvent mixture was homogenized and with no visible chunks. Additional 38.6 g nickel powders from Vale were added to mixture and mixed at 2300 rpm for 2 min. In a separate container, 2 wt. % benzoyl peroxide (with respect to SR210) was added to 2 mL MEK solvent, and vortexed for couple minutes until it was fully dissolved. The benzoyl peroxide MEK solution was added to nickel-acrylate fluoro-solvent mixture, and mixed via Flactek mixer for 1 minute at 2300 rpm. 375 µL FIRSTCURE® DMPT cure promoter was added to the mixture, and mixed via Flactek mixer for 1 minute at 2300 rpm. The resulting homogenized mixture was heated at 110 C in a heating mantle. The polymerization occurred within 5 minutes. The nickel fluorogel was cured and formed a big block, and then broken into smaller pieces with a spatula, followed by a centrifugal mixing for 20 seconds at 2300 rpm. The resulting nickel fluorogel was spreadable/flowable.

Preparation of laminate composite: ~30 mil thick nickel fluorogel was cast on a cured FlexSeal Clear Liquid film. Additional FlexSeal Clear Liquid was cast on top of the nickel fluorogel to fully encapsulate the laminate composite, and cured in room temperature overnight. The thickness of this composite was about 100 mil.

Example 6: Nickel Fluoro Gel (Fluorinated Acrylate), with Silver Knit, and Laminate Composite Prepared Therefrom Preparation of conductive fluorofluid: 70 g HC/04 and 40 g nickel powder from Vale were mixed at 1500 rpm for 1 minute. 6 g Ni wires (8 µm×3 mm) were mixed to the mixture via overhead shear mixer at speed 2 overnight, followed by a speed 8 fast mixing for 1 hour. Additional 20 g nickel powder from Vale were added to mixture and mixed at 1500 rpm for 1 minute. Next, 14 g AD1700 (fluorinated acrylate) and 14 g n-butyl acetate were added to the mixture and mixed at 1500 rpm for 1 minute. The resulting nickel fluoro-solvent mixture was homogenized and with no visible chunks. Additional 40 g nickel powders from Vale were added to mixture and mixed at 1500 rpm for 2 min. In a separate container, 2 wt. % benzoyl peroxide (with respect to AD1700) was added to 2 mL MEK solvent, and vortexed for couple minutes until it was fully dissolved. The benzoyl peroxide MEK solution was added to nickel-acrylate fluoro-solvent mixture, and mixed via Flactek mixer for 1 minute at 1500 rpm. 280 µL FIRSTCURE® DMPT cure promoter was added to the mixture, and mixed via Flactek mixer for 1 minute at 1500 rpm. The resulting homogenized mixture was heated at 110 C in a heating mantle. The polymerization occurred within 5 minutes. The resulting nickel fluorogel was spreadable and workable.

Preparation of conductive fluorogel filled conductive Ag knit laminate composite: a spatula was used to spread the flowable conductive fluorogel paste into the silver knit.

Nusil vacuum infiltration: Nusil R21-2615 liquid silicone rubber is a two-part, translucent silicone system with a 1:1 part A to part B mixing ratio with a rapid thermal cure. Equal parts were weighed into a Flacktek container and mixed for 1 minute at 2300 rpm. The resulting homogenous resin was poured on top of a panel with a Mylar release film, and a 30 mil thick film was cast using a glass rod. The nickel fluorogel filled silver knit was placed on top of the NuSil film, the remaining NuSil mixture poured atop the knit, and distributed evenly using a glass rod. A top panel, Mylar release film side faced down, was placed on top of the resin and a sheet of breather atop of the panel. A vacuum connector was placed inside the vacuum bag before sealing, a 0.5 inch slit was cut into the vacuum bag, and the vacuum hose connected through the slit. The vacuum pump was turned on as soon as the system was sealed and the pressure maintained at −25 inches Hg. The whole vacuum bagging setup was placed on top of a 60° C. hot place for rapid thermal cure for about 40 minutes. The composite was removed from the setup after 1 hour. Additional NuSil R21-2615 was added/painted on the composite surface to make sure nickel fluorogel was fully encapsulated. The thickness of this composite was about 60-120 mil.

Example 7: Nickel Fluorogel (Uncured Fluorinated Acrylate Network), with Ag Knit, and Laminate Composite Prepared Therefrom Ni fluorogel synthesis: 70 g HC/04 and 30 g nickel vale powder were mixed at 1500 rpm for 1 minute. 4 g nickel wires (8 µm×3 mm) were mixed to the mixture via overhead shear mixer at speed 2 overnight, followed by a speed 8 fast mixing for 1 hour. Additional 30 g nickel vale powder were added to mixture and mixed at 1500 rpm for 1 minute. Next, 11 g AD1700 (fluorinated acrylate) and 14 g n-butyl acetate were added to the mixture and mixed at 1500 rpm for 1 minute. The resulting nickel fluoro-solvent mixture should be homogenized and no visible chunks. Additional 30 g nickel Vale powders were added to mixture and mixed at 1500 rpm for 2 min. The homogenized mixture did not go through polymerization step. The mixture was spreadable/flowable.

Preparation of conductive fluorogel filled conductive Ag knit laminate composite: a spatula was used to spread the flowable conductive fluorogel paste into the silver knit.

Nusil vacuum infiltration: Nusil R21-2615 liquid silicone rubber is a two-part, translucent silicone system with a 1:1 part A to part B mixing ratio with a rapid thermal cure. Equal parts were weighed into a Flacktek container and mixed for 1 minute at 2300 rpm. The resulting homogenous resin was poured on top of a panel with a Mylar release film, and a 30 mil thick film was cast using a glass rod. The nickel fluorogel filled silver knit was placed on top of the NuSil film, the remaining NuSil mixture poured atop the knit, and distributed evenly using a glass rod. A top panel, Mylar release film side faced down, was placed on top of the resin and a sheet of breather atop of the panel. A vacuum connector was placed inside the vacuum bag before sealing, a 0.5 inch slit was cut into the vacuum bag, and the vacuum hose connected through the slit. The vacuum pump was turned on as soon as the system was sealed and the pressure maintained at −25 inches Hg. The whole vacuum bagging setup was placed on top of a 60° C. hot place for rapid thermal cure for about 40 minutes. The composite was removed from the setup after 1 hour. Additional NuSil R21-2615 was added/painted on the composite surface to make sure nickel fluorogel was fully encapsulated. The thickness of this composite was about 60-120 mil.

Figure 4:
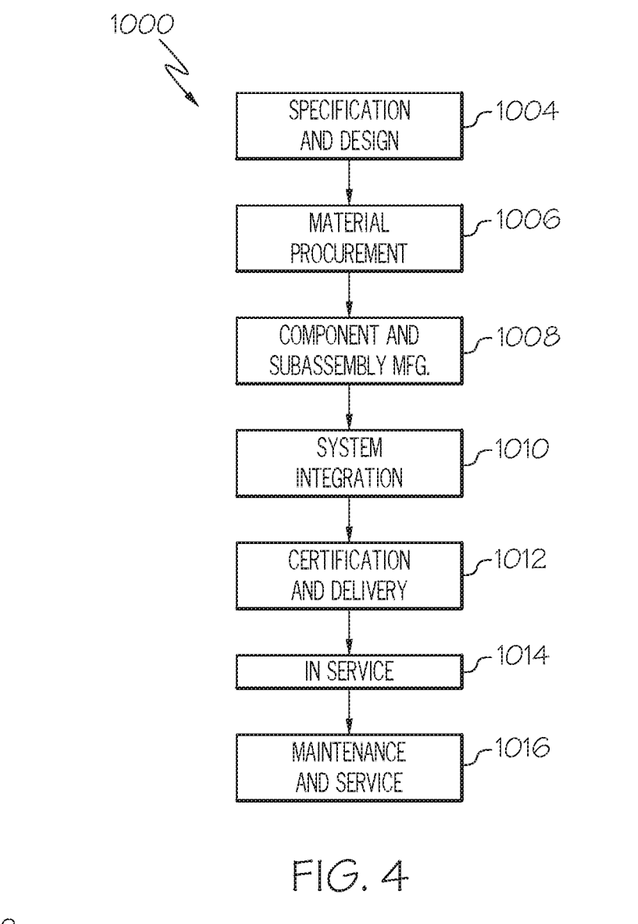
FIG. 4 is a flow diagram of an aircraft manufacturing and service methodology.
Figure 5:
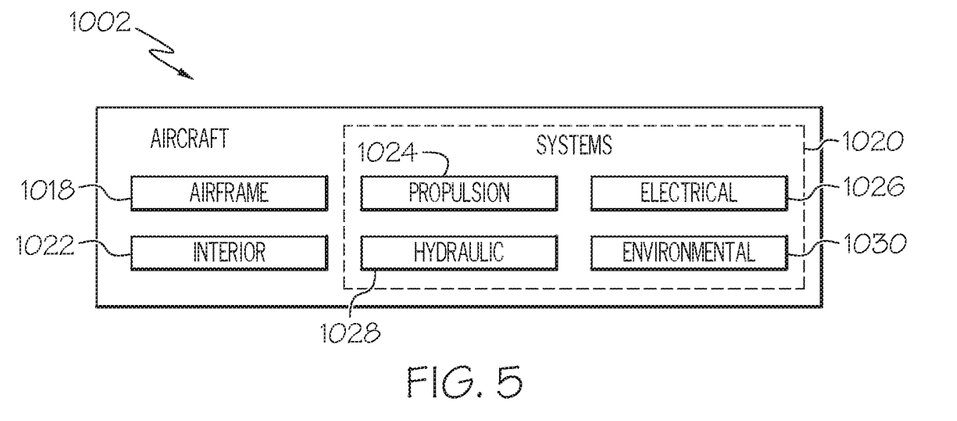
FIG. 5 is a block diagram of an aircraft.

Examples of the present disclosure may be described in the context of an aircraft manufacturing and service method 1000, as shown in FIG. 4, and an aircraft 1002, as shown in FIG. 5. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment, and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The conductive composites of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 5, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The conductive composites of the present disclosure may be employed for any of the systems of the aircraft 1002.

Although various embodiments of the disclosed conductive composite and method for manufacturing a conductive composite have been shown and described, modifications may occur to those skilled in the art upon reading the specification. The present application includes such modifications and is limited only by the scope of the claims.

What is claimed is:

1. A conductive composite comprising:
a first layer of elastomeric polymer;
a layer of composite fluid on the first layer of elastomeric polymer, wherein the composite fluid comprises a fluorofluid that is not cured or hardened into a solid state and a solid conductive additive; and
a second layer of elastomeric polymer on the layer of conductive fluorofluid,
wherein edges of the conductive composite are sealed around the layer of conductive fluorofluid.

2. The conductive composite of claim 1 wherein the fluorofluid includes at least one of a perfluoropolyether, a fluorinated acrylate oligomer, and combinations thereof.

3. The conductive composite of claim 1 wherein the fluorofluid has a viscosity in a range of from about 2,000 cP to about 10,000,000 cP.

4. The conductive composite of claim 1 wherein the solid conductive additive includes at least one of carbon fiber, coated carbon fiber, and a metallic material.

5. The conductive composite of claim 1 wherein the solid conductive additive includes a metallic material, wherein the metallic material includes at least one of stainless steel, brass, iron, nickel, titanium, aluminum, copper, silver, gold, platinum, palladium, and zinc.

6. The conductive composite of claim 1 wherein the layer of composite fluid further comprises a compatibilizing agent.

7. The conductive composite of claim 1 wherein the layer of composite fluid further comprises an organic compatibilizing agent, and wherein the organic compatibilizing agent comprises at least one of an ionic surfactant, a nonionic surfactant, and combinations thereof.

8. The conductive composite of claim 1 wherein the layer of composite fluid further comprises an additive to increase thermo-oxidative stability, wherein the additive comprises at least one of a phosphate, an iron oxide, a phenolic, an antioxidant, a metal passivator, and combinations thereof.

9. The conductive composite of claim 1 wherein the first layer of elastomeric polymer comprises at least one of siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, and combinations thereof.

10. The conductive composite of claim 1 wherein the second layer of elastomeric polymer comprises at least one of siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, and combinations thereof.

11. The conductive composite of claim 1 wherein a thickness of the first layer of elastomeric polymer is within a range of from about 0.01 mm to about 100 mm.

12. The conductive composite of claim 1 wherein a thickness of the second layer of elastomeric polymer is within a range of from about 0.01 mm to about 100 mm.

13. The conductive composite of claim 1 wherein a thickness of the layer of composite fluid is less than or equal to at least one of a thickness of first layer of elastomeric polymer and a thickness of the second layer of elastomeric polymer.

14. The conductive composite of claim 1 wherein a thickness of the layer of composite fluid is greater than at least one of a thickness of first layer of elastomeric polymer and a thickness of the second layer of elastomeric polymer.

15. The conductive composite of claim 1 wherein a thickness of the layer of composite fluid is greater than a total of a thickness of first layer of elastomeric polymer and a thickness of the second layer of elastomeric polymer.

16. The conductive composite of claim 1 further comprising a reinforcement mesh in contact with the layer of composite fluid.

17. The conductive composite of claim 16 wherein the reinforcement mesh comprises a fabric.

18. The conductive composite of claim 1 the conductive composite comprises an edge length of elastomeric polymer around the layer of composite fluid sealing the composite fluid within the conductive composite.

19. The conductive composite of claim 18 wherein the edge length is greater than or equal to at least one of a thickness of the first layer of elastomeric polymer and a thickness of the second layer of elastomeric polymer.

20. The conductive composite of claim 1 wherein the second layer of elastomeric polymer is bonded to the first layer of elastomeric polymer.

21. The conductive composite of claim 1 wherein the conductive composite exhibits a minimum sheet resistance of less than about 100 Ohm/sq.

22. The conductive composite of claim 1 wherein the conductive composite exhibits an elongation at break of greater than or equal to about 10%.

23. The conductive composite of claim 1 wherein the conductive composite exhibits a tensile strength greater than or equal to about 3 MPa.

24. The conductive composite of claim 1 wherein the conductive composite has a density of less than about 7 g/mL.

25. The conductive composite of claim 1 wherein the conductive fluorofluid has a loss modulus greater than a storage modulus.

26. The conductive composite of claim 1 wherein the conductive composite is a portion of an aircraft.

27. The conductive composite of claim 1 wherein the conductive additive has an aspect ratio of less than about 2.

28. A method for manufacturing a conductive composite, the method comprising:
   forming a first layer of elastomeric polymer;
   forming a layer of composite fluid on the first layer of elastomeric polymer, wherein the composite fluid comprises a fluorofluid that is not cured or hardened into a solid state and a solid conductive additive; and
   forming a second layer of elastomeric polymer on the layer of conductive fluorofluid,
   wherein edges of the conductive composite are sealed around the layer of conductive fluorofluid.

* * * * *